(12) United States Patent
Gonzalez-Castaño et al.

(10) Patent No.: US 8,839,324 B2
(45) Date of Patent: Sep. 16, 2014

(54) METHOD AND SYSTEM FOR DIGITAL CONTENT TRANSMISSION

(75) Inventors: Francisco Javier Gonzalez-Castaño, Vigo (ES); Rafael Asorey Cacheda, Vigo (ES)

(73) Assignee: Gradiant, Centro Tecnolóxico de Telecomunicacións de Galicia, Vigo (ES)

( * ) Notice: Subject to any disclaimer, the term of this patent is extended or adjusted under 35 U.S.C. 154(b) by 0 days.

(21) Appl. No.: 13/570,448

(22) Filed: Aug. 9, 2012

(65) Prior Publication Data

US 2013/0047191 A1 Feb. 21, 2013

Related U.S. Application Data

(60) Provisional application No. 61/523,405, filed on Aug. 15, 2011.

(51) Int. Cl.
*H04N 7/173* (2011.01)

(52) U.S. Cl.
USPC .............. 725/101; 725/86; 725/87; 725/91; 725/93; 725/94; 725/95; 725/96; 725/97; 725/98; 725/100; 725/103; 725/104

(58) Field of Classification Search
USPC ........................ 725/102, 103, 86–101, 104
See application file for complete search history.

(56) References Cited

U.S. PATENT DOCUMENTS 6,502,139 B1 * 12/2002 Birk et al. ............... 709/233
7,992,069 B2 * 8/2011 Miyata et al. ........... 714/755

* cited by examiner

*Primary Examiner* — Pankaj Kumar
*Assistant Examiner* — Alazar Tilahun
(74) *Attorney, Agent, or Firm* — Mateo Aboy; Aboy & Associates PC (57) ABSTRACT

Disclosed embodiments include a method and an apparatus for digital content transmission that comprise: (a) partitioning the digital content into a plurality of sequential segments; (b) selecting a plurality of transmission time instants for each of the sequential segments as a function of their order; (c) generating a plurality of linear combinations of the plurality of sequential segments during the plurality of transmission time instants resulting in a plurality of linearly combined coded segments; and (c) transmitting the plurality of linearly combined coded segments from a server to a plurality of clients. In particular embodiments, the method and apparatus further comprise performing error correction based on an implicit error correction (IEC) method that employs the redundancy present in the linearly combined coded segments to perform error correction at the client side without extra bandwidth cost.

17 Claims, 10 Drawing Sheets

FIG.1

| | $t$ | $t+1$ | $t+2$ | $t+3$ | $t+4$ | $t+5$ | $t+6$ | |
|---|---|---|---|---|---|---|---|---|
| CHANNEL 1 | $S_1$ | $S_1$ | $S_1$ | $S_1$ | $S_1$ | $S_1$ | $S_1$ | ... |
| CHANNEL 2 | $S_2$ | $S_4$ | $S_2$ | $S_8$ | $S_2$ | $S_4$ | $S_2$ | ... |
| CHANNEL 3 | $S_3$ | $S_6$ | $S_5$ | $S_3$ | $S_7$ | $S_9$ | $S_3$ | ... |

PERIODIC BROADCASTING SCHEMA

FIG.2

| | $t$ | $t+1$ | $t+2$ | $t+3$ | $t+4$ | $t+5$ | $t+6$ | |
|---|---|---|---|---|---|---|---|---|
| CHANNEL 1 | $\sigma_{1,t}$ | $\sigma_{1,t+1}$ | $\sigma_{1,t+2}$ | $\sigma_{1,t+3}$ | $\sigma_{1,t+4}$ | $\sigma_{1,t+5}$ | $\sigma_{1,t+6}$ | ... |
| CHANNEL 2 | $\sigma_{2,t}$ | $\sigma_{2,t+1}$ | $\sigma_{2,t+2}$ | $\sigma_{2,t+3}$ | $\sigma_{2,t+4}$ | $\sigma_{2,t+5}$ | $\sigma_{2,t+6}$ | ... |
| CHANNEL 3 | $\sigma_{3,t}$ | $\sigma_{3,t+1}$ | $\sigma_{3,t+2}$ | $\sigma_{3,t+3}$ | $\sigma_{3,t+4}$ | $\sigma_{3,t+5}$ | $\sigma_{3,t+6}$ | ... |

PERIODIC BROADCASTING SCHEMA WITH IMPLICIT ERROR CORRECTION

METHOD AND SYSTEM FOR DIGITAL CONTENT TRANSMISSION

CROSS-REFERENCE TO RELATED APPLICATIONS

This application claims the benefit of U.S. Provisional Application No. 61/523,405 filed on 2011 Aug. 15 by the present inventors, which is incorporated herein by reference.

TECHNICAL FIELD

Disclosed embodiments relate to wireless transmission of digital content. Specifically, they relate to methods, apparatuses, and systems for wireless transmission of digital content to multiple concurrent clients in near Video-on-Demand (nVoD) applications.

BACKGROUND

Currently, most multimedia services are offered over broadband wired networks. However, wired networks may be too costly for rural areas, where infrastructure deployment is costly and difficult. Additionally, there are many other practical applications that require robust wireless transmission of digital content without compromising service quality, such as content transmission in planes.

Near Video-on-Demand (NVoD) broadcast-oriented protocols, such as periodic broadcast, patching, and bandwidth skimming, divide media files into segments. These segments are simultaneously broadcasted at different rates according to their impact on content playback delay. The clients receive multiple streams at a time, with an aggregate transmission rate that is proportional to real-time content playing rate. Existing protocols do not directly deal with packet losses and redundant packets, which are common in wireless networks. Error protection is achieved by introducing protocol overheads. These protocols are mostly intended for wired networks, and for Internet nVoD systems.

U.S. Pat. No. 7,941,825 discloses an efficient NVoD service method for various client environments designed for transmitting video data from a server to a plurality of clients. This method is based on identifying the relative network bandwidth of a client with respect to the video playout bandwidth, and dividing the video data into data segments of different sizes according to their relative bandwidth. As is the case with other related art publications, this disclosure does not address how to solve the fundamental problem of error correction during transmissions.

Currently, there is a need for protocols, schemas, architectures, methods, and systems to improve the service quality in digital transmission applications by implementing novel error correction methods with low overhead.

BRIEF DESCRIPTION OF THE DRAWINGS

Disclosed embodiments are illustrated by way of example, and not by way of limitation, in the figures of the accompanying drawings.

DETAILED DESCRIPTION

A. Overall Method and System Description

Figure 1:
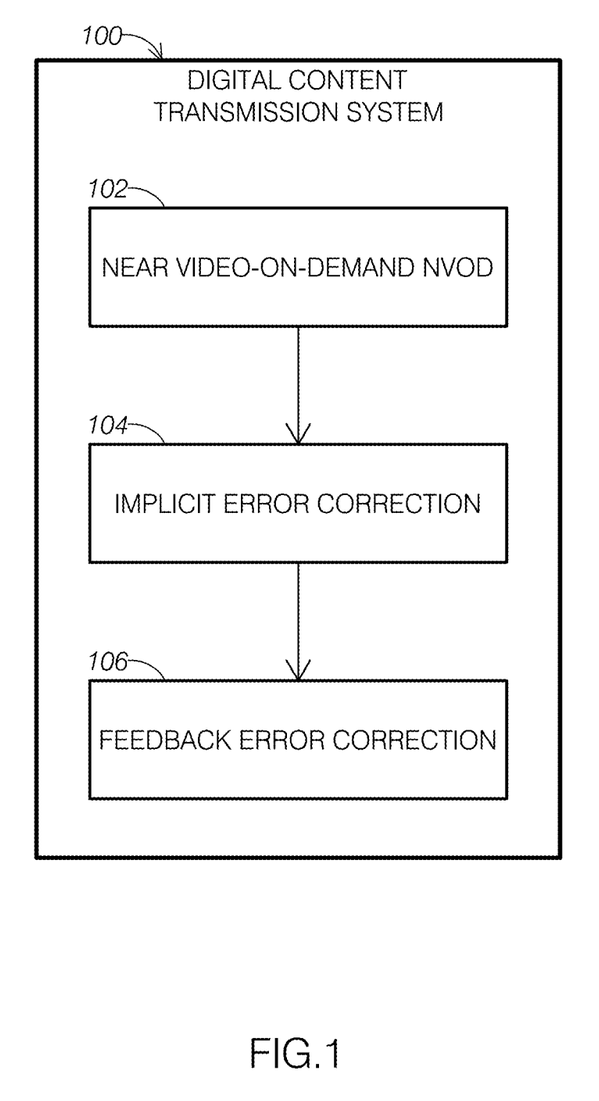
FIG. 1 shows a general illustration of the system components according to one embodiment.

As shown in FIG. 1, according to one embodiment, the system for digital content transmission 100 comprises: (a) a near video on demand (nVoD) method 102 for transmitting the digital content from a server to a plurality of client devices; and (b) an implicit error correction method 104 based on searching one or more previously decoded segments and using them for decoding a received segment. In a particular embodiment, the system for digital content transmission further comprises a feedback error correction method 106. The feedback error correction method 106 comprises: (a) storing a plurality of undecoded segments; and (b) reloading the previously stored undecoded segments and attempting to decode them using recently decoded segments as redundancy. According to one embodiment, the system 100 comprises hardware (server and clients with specific architectures), and hardware-implemented methods for transmission and error correction.

Figure 5:
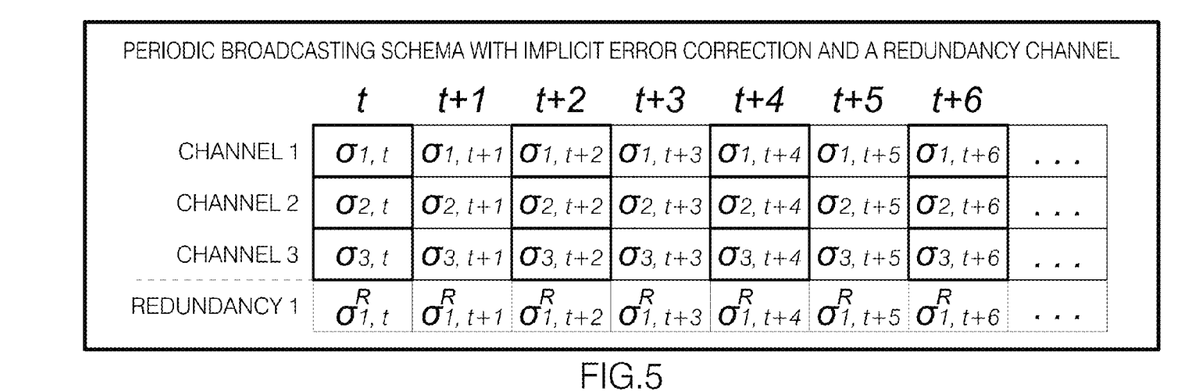
Figure 8:
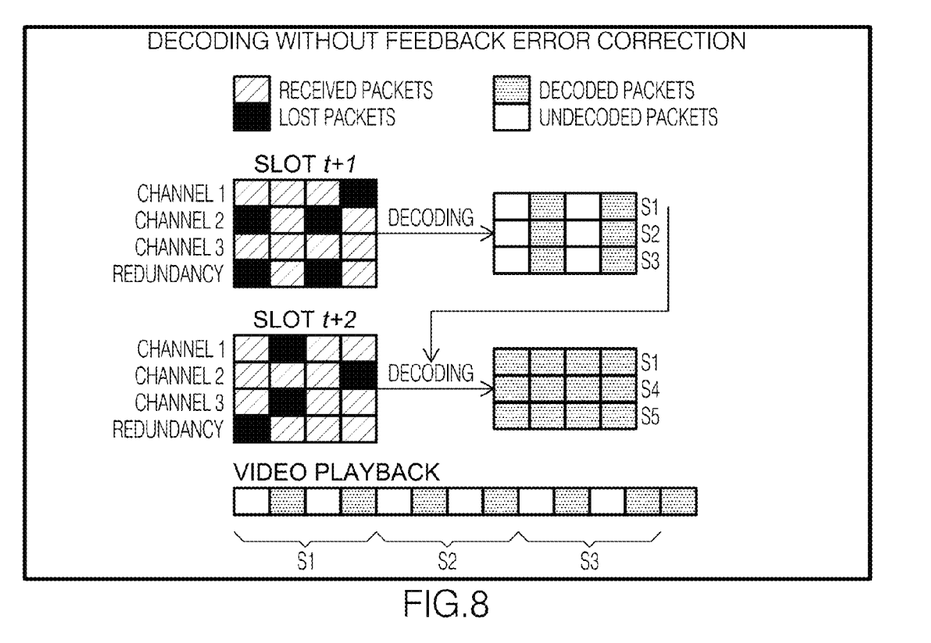
FIG. 8 shows a diagram illustrating the process of decoding without feedback error correction.

According to one embodiment, the method for digital content transmission comprises: (a) partitioning the digital content into a plurality of sequential segments; (b) selecting a plurality of transmission time instants for each of the sequential segments as a function of the order of the plurality of sequential segments; c) generating a plurality of linear combinations of the plurality of segments during the plurality of transmission time instants resulting in a plurality of linearly combined coded segments; and (c) transmitting the plurality of linearly combined coded segments from a server to a plurality of clients. In a more particular embodiment, the method of digital content transmission further comprises performing error correction based on an implicit error correction (IEC) method that performs error correction without extra bandwidth cost by using the redundancy present in the linearly combined coded segments to provide intrinsic error correction at the client side without extra bandwidth cost. The IEC method error protection level increases with time and it is a zero overhead error correction method. In one embodiment, this is achieved by using previously decoded segments to invert coded segments and recover lost segments. Additionally, in one embodiment, the IEC method can use a selected number of extra channels for explicit redundancy during specified times of a transmission to guarantee a desired packet loss recovery as shown in FIG. 5 and FIG. 8 (for instance, and without limitation, at the beginning of the transmission). In an alternative embodiment, the IEC method can also implement a modified schema that forces an initial playback delay.

Figure 9:
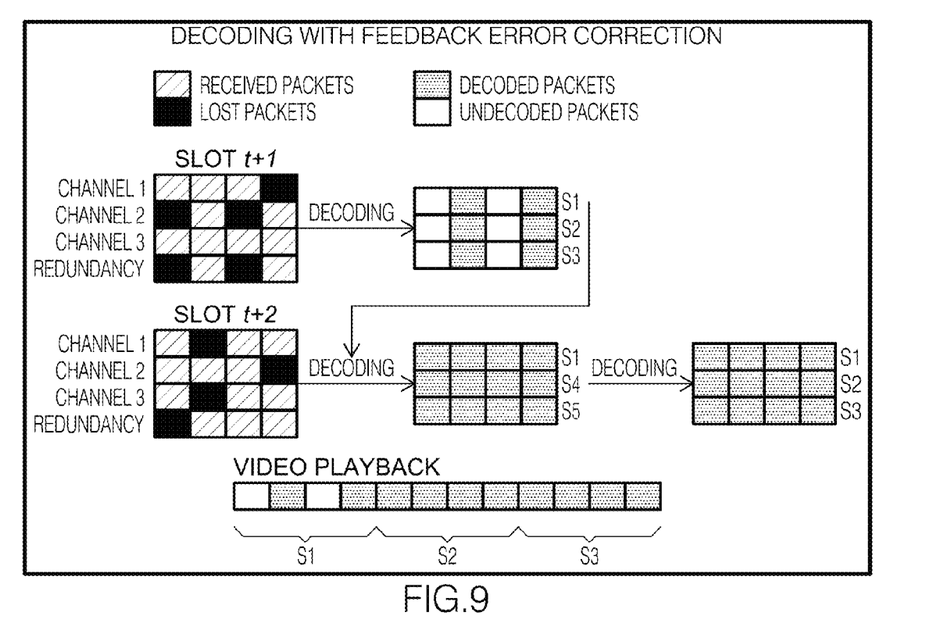
FIG. 9 shows a diagram illustrating the process of decoding with feedback error correction.
Figure 11:
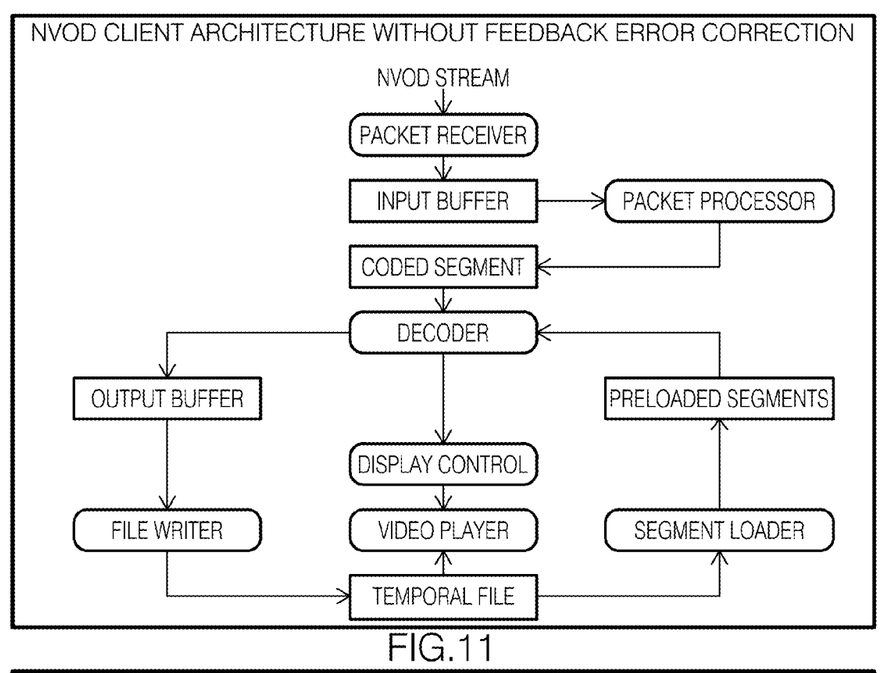
FIG. 11 shows a block diagram illustrating the NVoD client architecture without feedback error correction according to one embodiment.
Figure 12:
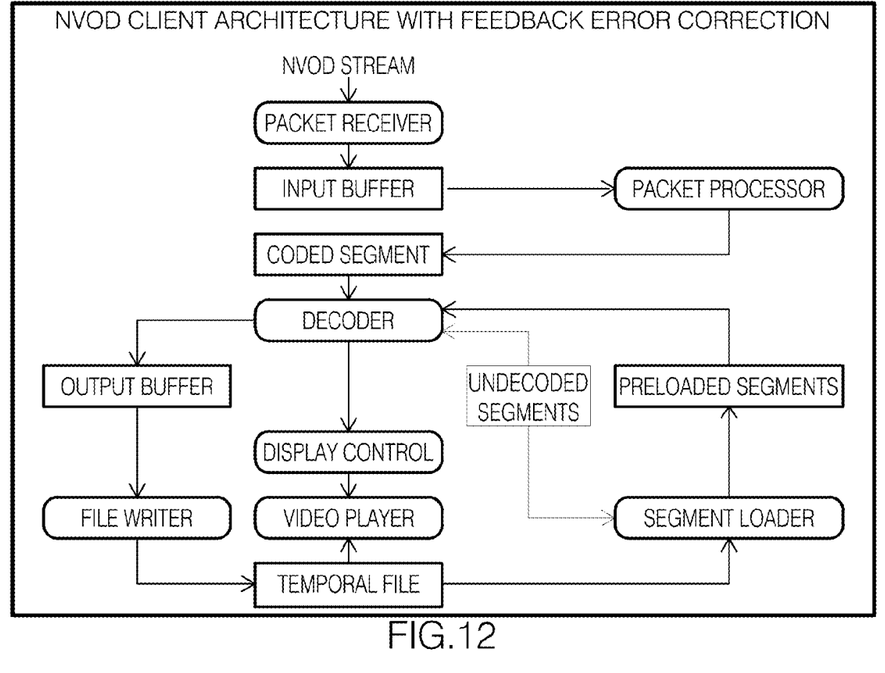
FIG. 12 shows a block diagram illustrating the NVoD client architecture with feedback error correction according to one embodiment.
Figure 13:
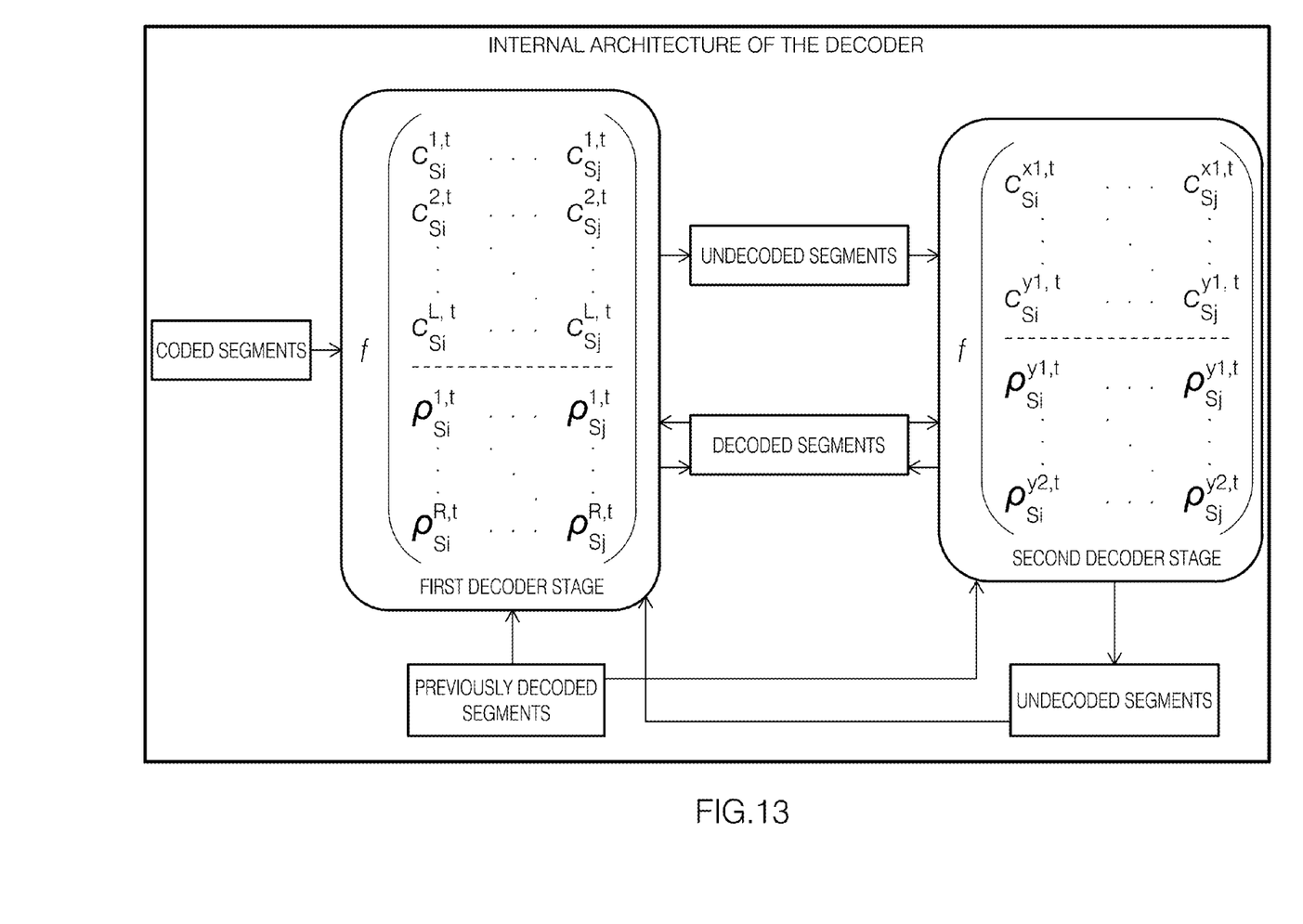
FIG. 13 shows a block diagram illustrating the internal architecture of the decoder with feedback error correction according to one embodiment.

According to one embodiment, the method for digital transmission includes an IEC method and a feedback error correction method, as shown in FIG. 9. In a particular embodiment, the feedback error correction method comprises: (a) storing a plurality of undecoded segments; and (b) reloading the previously stored undecoded segments and attempting to decode them using recently decoded segments. The client includes a separate buffer for the undecoded segments. FIG. 11 shows a block diagram illustrating the NVoD client architecture according to one embodiment without feedback error correction, and FIG. 12 shows a block diagram illustrating the NVoD client architecture according to one embodiment with feedback error correction. FIG. 13 shows a block diagram illustrating a possible internal architecture of the decoder according to one embodiment with feedback error correction.

Certain specific details are set forth in the above description and figures to provide an understanding of various embodiments disclosed for those of skill in the art. Certain well-known details often associated with telecommunications, computing and software technology are not set forth in the following disclosure to avoid unnecessarily obscuring the various disclosed embodiments. Further, those of ordinary skill in the relevant art will understand that they can practice other embodiments without one or more of the details described in the present disclosure. Aspects of the disclosed embodiments may be implemented in the general context of computer-executable instructions, such as program modules, being executed by a computer, computer server, or device containing a processor. Generally, program modules or protocols include routines, programs, objects, components, data structures, hardware executable instructions that perform particular tasks or implement particular abstract data types. Aspects of the disclosed embodiments may also be practiced in distributed computing environments where tasks are performed by remote processing devices (processors, microprocessors, computing systems, FPGAs, programable ICs, etc) that are linked through a communications network. In a distributed computing environment, program modules and hardware executable instructions may be located in both local and remote storage media such as memory storage devices (including non-transitory storage media). Those skilled in the art will appreciate that, given the description of the modules comprising the disclosed embodiments provided in this specification, it is a routine matter to provide working systems which will work on a variety of known and commonly available technologies capable of incorporating the features described herein. Additionally, the methods described herein can be implemented in a hardware-readable storage medium (including non-transitory computer-readable media) with an executable program stored thereon, wherein said executable program instructs the processing hardware to perform the method steps.

B. Method and System Description

This section provides a detailed description of the method and system for wireless transmission of digital content according to particular embodiments, and without limitation.

Error correction schemas for nVoD that keep the advantages of traditional server-initiated nVoD systems, such as unlimited scalability are desired. One approach to solve this problem is to exploit the intrinsic redundancy of the systems to provide intrinsic error correction capabilities at the client side without extra bandwidth cost. We refer to this approach as Implicit Error Correction (IEC). A detailed explanation of the IEC method is provided in the subsection below.

In addition to the IEC method, other error protection methods can be implemented on periodic nVoD schemas. According to one embodiment, the system splits contents into segments of equal size and applies linear coding at different rates. This schema achieves error protection by producing longer coded segments than the original ones (i.e., by adding redundancy information). The portion of a segment transmitted in a given time slot depends on its retransmission frequency; segments with higher frequencies are protected by lower redundancy. As a result, all segments are equally protected at the cost of imposing an initial playback delay that is an exponential function of the protection level. With this schema, the protection level remains constant during the entire playback, while with the proposed IEC schema the protection level increases with time.

B.1. IEC nVoD Schema

Figure 2:
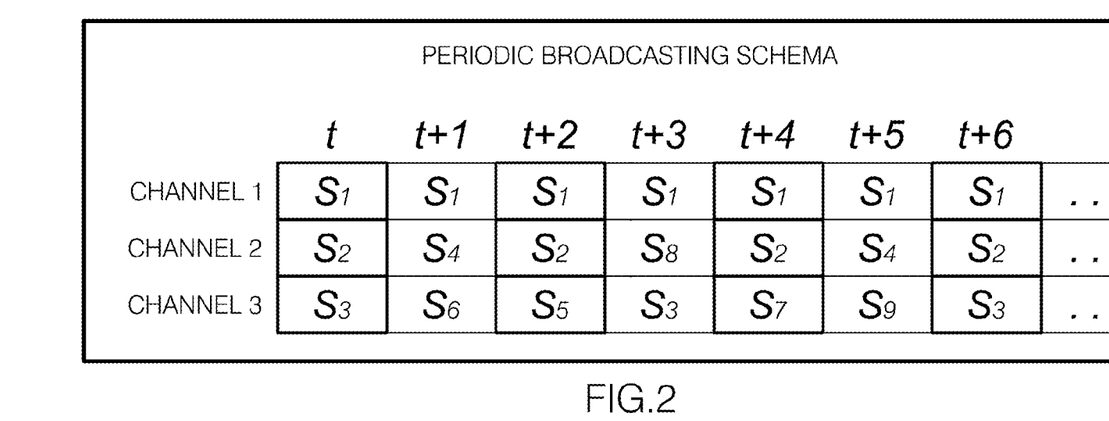
FIG. 2 shows an example of a periodic broadcasting schema.

According to one embodiment, and without limitation, the IEC nVoD schema proposed is based on "periodic broadcasting." FIG. 2 shows an example of a harmonic broadcasting schema, a type of periodic schema. It splits files into n segments $(s_1, s_2, \ldots, s_n)$ of fixed length that are transmitted through $L \in \mathbb{N}$ independent multicast channels at different frequencies. The segment frequency sets a deadline for segment retransmission. For example, a segment with a frequency ½ in a given time slot must be retransmitted within the next two slots. In order to minimize bandwidth usage, the frequencies must be as low as possible. FIG. 2 shows a suboptimal harmonic broadcasting schema. The rows and columns represent channels and time slots, respectively. Segment $s_1$ has a frequency of 1, segment $s_2$ has a frequency of ½, segment $s_3$ has a frequency of ⅓ and so on for all remaining segments. This schema requires a suboptimal albeit constant bandwidth. A regular schema satisfies $T(s_i) \leq i$ (where $T(s_i)$ is the period of segment $s_i$).

According to one embodiment, the bandwidth $B_n$ required for the IEC schema is defined as follows:

$$B_n = \sum_{k=1}^{n} \frac{1}{T(s_k)} r, \quad (1)$$

where r is the content rate. The minimum of this expression corresponds to $T(s_i) = i$:

$$B_n \leq \sum_{k=1}^{n} \frac{1}{k} r = H_n r, \quad (2)$$

where $H_n$ is a harmonic number defined by:

$$H_n = \sum_{k=1}^{n} \frac{1}{k} \quad (3)$$

Consequently, from the previous expression it can be concluded that $L > H_n$, $n > 1$, as harmonic numbers are always non-integers but for n=1. As n grows, $L \gtrsim H_n$. For this reason, it is convenient to choose an n such that $L \approx H_n$, $L \in \mathbb{N}$ (the difference is bounded by 1/n).

Figure 3:
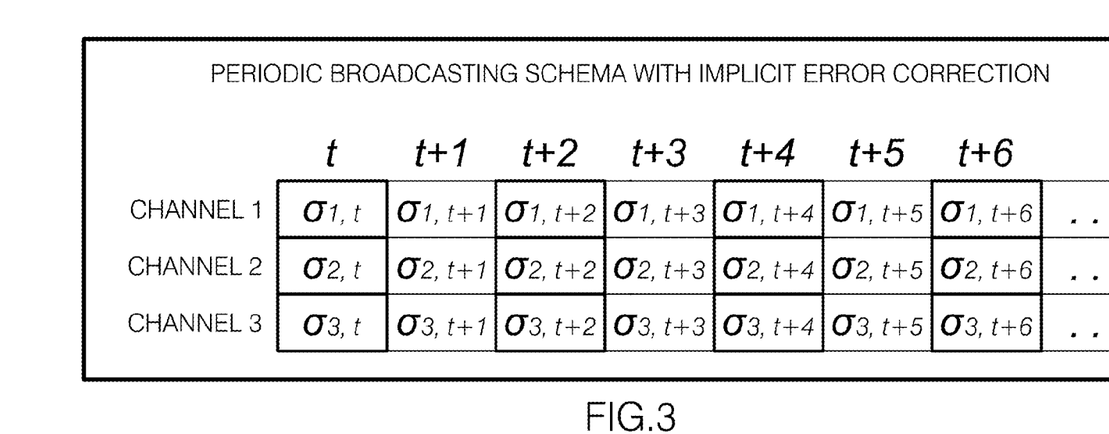
FIG. 3 shows an illustrative example of a periodic broadcasting schema with implicit error correction.

FIG. 3 shows an illustrative example of a periodic broadcasting schema with implicit error correction. According to one embodiment, the video content S is divided into n segments of equal size, $S = \{s_1, s_2, \ldots, s_n\}$. The encoded segments $\sigma_{m,t}$ for channel m and time slot t in FIG. 3 result from the following operation on the subset of original segments $s_i \ldots s_j$ ($|\{s_i \ldots s_j\}|=L>H_n$), where "$\oplus$" is the standard bitwise xor operation and "·" is the multiplication:

$$\sigma_{m,t} = c_{s_i}^{m,t} \cdot s_i \oplus \ldots \oplus c_{s_j}^{m,t} \cdot s_j$$

$$\{c_{s_i}^{m,t} \ldots c_{s_j}^{m,t}\} \in \{0,1\} \quad (4)$$

According to one embodiment, the ability of the system to recover all the segments depends on certain mathematical conditions including the invertibility of certain matrices as follows. Let $C^t$ be a binary matrix whose components are:

$$C^t = \begin{pmatrix} c_{s_i}^{1,t} & \cdots & c_{s_j}^{1,t} \\ c_{s_i}^{2,t} & \cdots & c_{s_j}^{2,t} \\ \vdots & \ddots & \vdots \\ c_{s_i}^{L,t} & \cdots & c_{s_j}^{L,t} \end{pmatrix}, L > H_n. \quad (5)$$

In order to recover all the segments in time slot t, $C^t$ must allow expression (4) to be invertible. Regarding the generation of sequence $C^t$, those of ordinary skill in the art can appreciate that sequences with good decoding efficiency can be found. Since the number of transmission channels may be low, it is easy to find linearly independent coded segments. Considering a number of multicast transmission channels ranging from L=4 to L=6, over 50% of the possible linear combinations of the original segments transmitted during a time slot t are linearly independent with one of the original segments at least, and over 30% of the combinations are linearly independent with two of the original segments at least.

According to one embodiment, a segment is composed of packets, whose number depends typically on the underlying networking protocols. This implies that, in the presence of errors, some parts of a segment can be recovered even if others are lost. This disclosure refers to packets and segments indistinguishably. It shall be understood that what applies to packages also applies to segments, and vice-versa.

According to one embodiment, one of the matrix sequences is chosen such that even if some coded segments get lost, previously recovered original segments help to invert the remaining segments (i.e., they serve as redundancy to correct errors in other slots). Those of ordinary skill in the art would appreciate that this solution results in zero overhead. While it may not be able to correct errors beyond a certain packet loss probability, that probability increases whenever the client obtains a new original segment. The maximum admissible packet loss rate as the downloading progresses, $p_{n,b}$, where n is the total number of content segments and b is the number of previously downloaded segments is given by $$p_{n,b} \leq \frac{H_{b-1}}{H_n} \quad (6)$$

Figure 4:
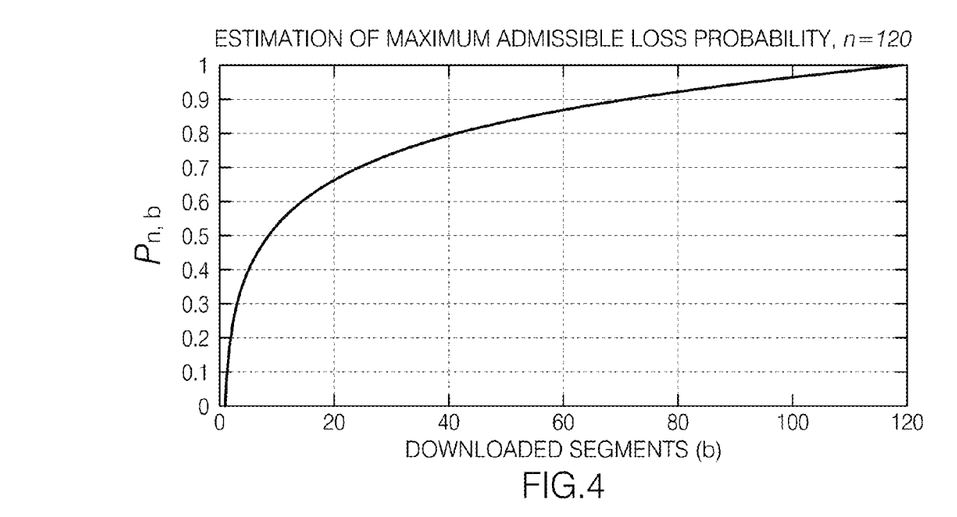
FIG. 4-7 show simulation results characterizing the properties of disclosed embodiments.

Expression (6) represents the upper bound on the information a receiver can lose without incurring decoding unfeasibility in a particular embodiment. $H_n$ is the ideal number of original segments transmitted in a time slot and $H_{b-1}$ is the average information already downloaded in the current time slot. FIG. 4 represents $p_{n,b}$ as a function of the downloaded segments, for a content partition of 120 segments. The probability $p_{n,b}$ increases whenever the client obtains a new segment.

According to a particular embodiment, low packet loss correction capabilities during the beginning of a reception is overcome by using redundancy channels. This increases bandwidth utilization but guarantees a given packet loss recovery. Thus, in the extended model a transmission can use up to L information channels and R redundancy channels, R≥0. Similarly to expression (4), a redundancy segment will be of the form:

$$\sigma_{m,t}^R = \rho_{s_i}^{m,t} \cdot s_i \oplus \ldots \oplus \rho_{s_j}^{m,t} \cdot s_j,$$

$$\{\rho_{s_i}^{m,t} \ldots \rho_{s_j}^{m,t}\} \in \{0,1\} \quad (7)$$

Figure 7:
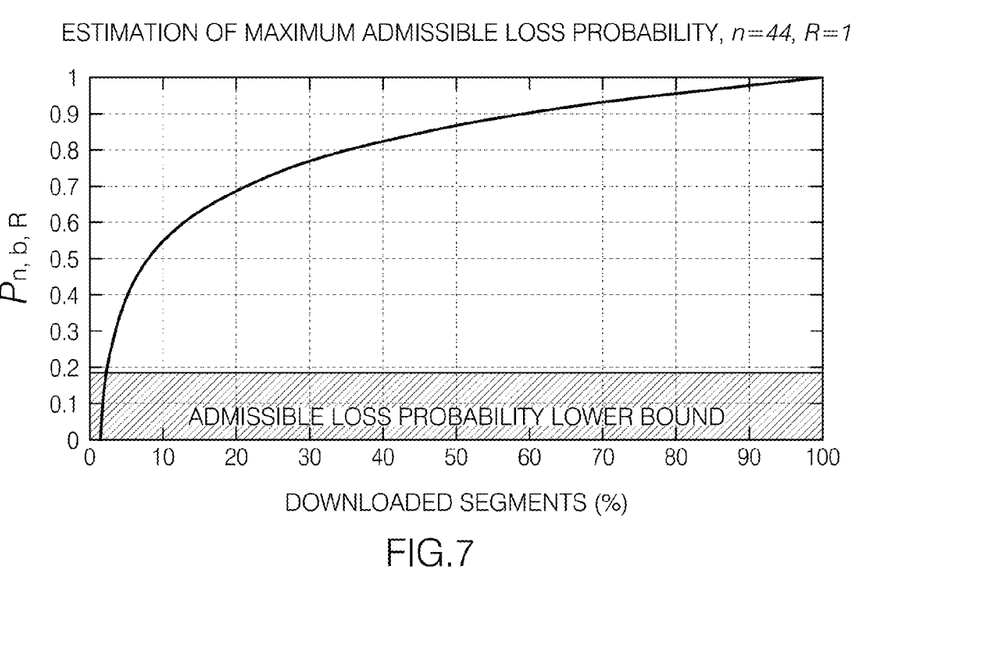

In the example in FIG. 7, for R=1 redundancy channels with 30% of the original segments, the client may recover from packet losses of 66%. By the end of the download, the curve tends to 1 as expected (no more packets are needed, thus allowing recovering from near-100% packet loss).

FIG. 5 shows the same illustrative example as in FIG. 3 with an extra channel for redundancy. The coding matrix $C^t$ will have a size of L+R rows by L columns:

$$C^t = \begin{pmatrix} c_{s_i}^{1,t} & \cdots & c_{s_j}^{1,t} \\ c_{s_i}^{2,t} & \cdots & c_{s_j}^{2,t} \\ \vdots & \ddots & \vdots \\ c_{s_i}^{L,t} & \cdots & c_{s_j}^{L,t} \\ \hline \rho_{s_i}^{1,t} & \cdots & \rho_{s_j}^{1,t} \\ \vdots & \ddots & \vdots \\ \rho_{s_i}^{R,t} & \cdots & \rho_{s_j}^{R,t} \end{pmatrix}, L > H_n \quad (8)$$

Similarly to $p_{n,b}$, let us define $p_{n,b,R}$ as the maximum admissible packet loss probability for an IEC schema with n segments during time slot b using R channels of redundancy. In this embodiment, in order to decode all the segments in time slot b the following must hold:

$$(1-p_{n,b,R})(H_n+R)+H_{b-1} \geq H_n \Rightarrow p_{n,b,R} \leq \frac{H_{b-1}+R}{H_n+R} \quad (9)$$

Figure 6:
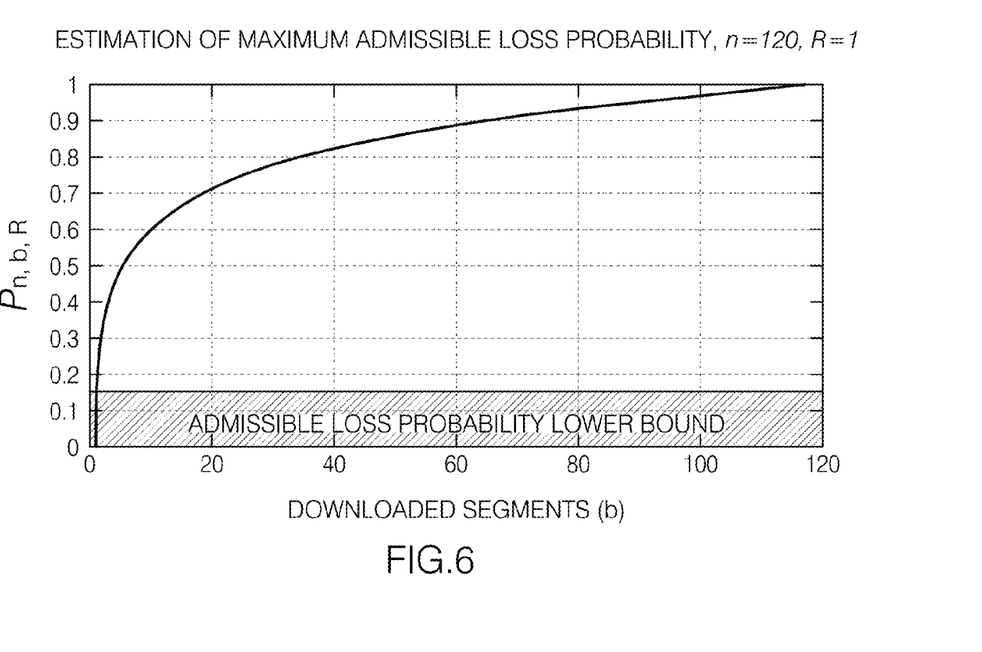

Expression (9) has a global minimum at b=1 as $H_n$ is a monotonically increasing unbounded function. Thus, $p_{n,1,R}=R/(H_n+R)$ is the minimum admissible packet loss probability for any time slot. FIG. 6 represents $p_{n,b,R}$ for an IEC schema with redundancy, n=120, R=1. This allows a minimum packet loss recovery of up to 16% for any time slot for a bandwidth increase of about 18% compared to the same IEC schema without redundancy.

An alternative embodiment for adding redundancy is based on reducing the number of information channels for a given aggregate bandwidth by reducing the number of segments and completing them with extra redundancy channels. This increases delay but eliminates the need for extra bandwidth. When n is large enough, a harmonic number can be approximated by:

$$H_n = \sum_{k=1}^{n} \frac{1}{k} \approx \gamma + \ln n, \quad (10)$$

where γ is the constant of Euler-Mascherano.

An assignment of R available channels to redundancy results in the number of segments n' that the schema can allocate, yielding:

$$H_{n'} \lesssim H_n - R \qquad (11)$$

Consequently, using expression (10) we obtain the following relationship:

$$\gamma + \ln n' \lesssim \gamma + \ln n - R \Rightarrow \frac{n}{n'} \gtrsim e^R \qquad (12)$$

Expression (12) shows that reserving R channels for redundancy will multiply delay by $e^R$. If we compare packet loss protection performance and consider that $n \approx n'e^R$, then we can also consider $(b-1) \approx (b'-1)e^R$. From expressions (9) and (12), we get the following:

$$p_{n',b',R} = \qquad (13)$$
$$\frac{H_{b'-1} + R}{H_{n'} + R} \approx \frac{\gamma + \ln(b'-1) + R}{\gamma + \ln n' + R} \approx \approx \frac{\gamma + \ln((b-1)e^{-R}) + R}{\gamma + \ln(ne^{-R}) + R} =$$
$$\frac{\gamma + \ln(b-1)}{\gamma + \ln n} \approx \frac{H_{b-1}}{H_n} = p_{n,b}, n \approx n'e^R, (b-1) \approx (b'-1)e^R$$

From expression (13) we deduce that using less channels for information does not worsens packet loss recovery during playback, but it does guarantee a minimum protection level by increasing initial playback delay. FIG. 7 represents $p_{n,b,R}$ for an IEC schema originally designed for n=120 segments, in which one of the channels is used for redundancy leading to an IEC schema with n'=44 and R=1. Consequently, this modified schema augments the delay by 120/44=2.72≈e as predicted by theory. It can be easily observed that packet loss recovery is very similar to that in FIG. 4. However, the redundancy channel raises the minimum admissible packet loss probability from 0 to about 18%.

Compared to a reference nVoD schema using the same delay and bandwidth setup, the theoretical initial error protection (and assuming ideal conditions such as perfect decoding efficiency and a uniform packet loss distribution) would be the same (the reference schema is disclosed in "Asynchronous Media Streaming over Wireless Broadcast Channels. Proceedings International Conference on Multimedia and Expo, ICME, 1318-1321, 2005"). However, the protection in the reference schema remains constant if it depends only on redundancy. The proposed IEC schema disclosed herein, in contrast, utilizes previously downloaded data to strengthen protection gradually.

B.2. Feedback Error Correction

According to one embodiment, the IEC method works as follows:
1. Firstly, within a given time slot, the decoder uses received packets to recover original packets. Because of packet losses, however, it is not possible to recover all the original information.
2. In a second stage, the decoder searches for previously downloaded packets in order to use them as redundancy.
3. After the second stage, all undecoded information is discarded.

In an alternative embodiment, the IEC method further incorporates feedback error correction as follows:
4. All undecoded packets are stored for future decoding.
5. The decoder reloads previously stored undecoded packets and, using the recently decoded ones as redundancy, tries to decode more.

An advantage of this embodiment (i.e., IEC with feedback error correction) is that it does not discard any information. The extra segments provided by feedback error correction improve the schema in several ways, including:
1. Unplayed segments improve playback quality while increasing error protection.
2. Segments that have been played cannot improve playback quality but they increase error protection, which leads to better playback quality for future segments.

To illustrate this, let us focus on the first two time slots of a client. Let us also define a packet loss probability $p_e$; i.e., a client receives on average $1-p_e$ of the total packets of a segment. A segment (encoded or unencoded) is composed of k packets and the IEC schema uses L channels for regular segment transmissions and R channels for redundancy. For the purposes of this mathematical derivation, we assume that decoding is an all or nothing process (i.e., if there are enough segments all the information will be decoded; otherwise nothing will be recovered). Finally, we assume that the decoder has an efficiency of 1 (i.e., decoding will always be succesful when there are at least as many encoded packets as original packets). Hence, during any slot transmission a client will receive an arbitrary number of packets depending on the channel properties. Without using any redundancy, a client needs to correctly receive all packets corresponding to a coding process. Thus, during the first time slot, with no redundancy, the probability of recovering the original information is $(1-p_e)^L$. If there are redundancy channels, this probability becomes:

$$\sum_{i=L}^{L+R} \binom{L+R}{i} (1-p_e)^i p_e^{L+R-i} \qquad (14)$$

Moreover, in the next time slot the only repeated segment is $s_1$. Consequently, according to this embodiment, during that slot it is only possible to use the recovered portions of $s_1$ as redundancy. In this case, to recover the original information, the client must receive all L segments or L−1 segments if $s_1$ was decoded in the first slot. Therefore, the probability of success can be written as:

$$(1-p_e)^L + p_e(1-p_e)^{L-1}(1-p_e)^L \qquad (15)$$

With redundancy channels, expression (15) becomes:

$$\sum_{i=L}^{L+R} \binom{L+R}{i}(1-p_e)^i p_e^{L+R-i} + \qquad (16)$$
$$\binom{L+R}{L-1} p_e^{R+1}(1-p_e)^{L-1} \sum_{i=L}^{L+R} \binom{L+R}{i}(1-p_e)^i p_e^{L+R-i}$$

By taking the segment assignment in FIG. 2 we can observe that the client receives segment $s_2$ during time slot t+1. According to IEC, $s_2$ will be played during t+3. Consequently, considering the IEC embodiment without feedback error recovery, $s_2$ contains all the errors that were not recovered during t+1 because undecoded segments are discarded. FIG. 8 shows an illustrative example of the results provided by the IEC architecture.

According to one embodiment, the IEC with feedback error recovery architecture does not discard undecoded segments. Instead, it stores them and tries to decode them in future time slots as new information becomes available. FIG. 9 shows how feedback error correction improves error recovery with respect to the example in FIG. 8. Analyzing again the case of segment $s_2$, we now observe that the parts of $s_1$ recovered during t+2 allow the complete decoding of $s_2$ and $s_3$. Hence, packet loss recovery improves thanks to feedback correction.

According to one embodiment, the system/method uses both redundancy and feedback error correction in addition to IEC. Redundancy channels provide extra protection against packet loss, which is specially useful during the first time slots. After that, redundancy is less relevant as most protection is provided by the previously downloaded segments. Feedback error correction improves the packet loss recovery performance of the system by storing the undecoded segments of a time slot and reusing them in subsequent slots. Extra decoded segments improve playback quality. Moreover, even segments that are recovered after their playback deadline are useful since they serve as redundancy for future time slots.

B.3. IEC Server and Client Architectures

This section discloses particular embodiments for possible server and client architectures designed to work with the previously described methods for implicit error correction and feedback error correction.

B.3.1. Server Architecture

Figure 10:
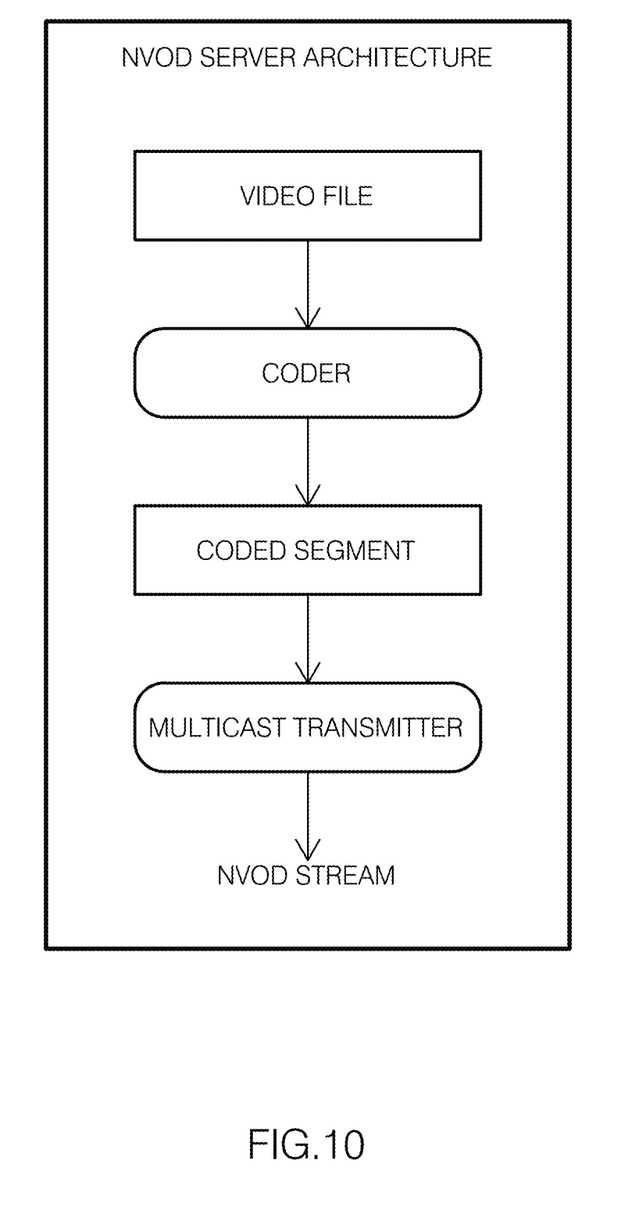
FIG. 10 shows a block diagram illustrating the NVoD server architecture according to one embodiment.

According to one embodiment, and without limitation, the server implementation is based on the IEC schema as shown in FIG. 10. For a given time slot the required segments are selected and coded. These coded segments are then transmitted through different multicast channels within different nVoD streams. The server architecture comprises a coder and a multicast transmitter.

According to one embodiment, coding proceeds as in the IEC architecture. In alternative embodiments, the architecture can be modified to allow the transmission of more channels than the minimum required by the IEC schema. The number of redundancy channels is set at start up.

B.3.2. Client Architecture

According to one embodiment, the IEC nVoD client is also based on the IEC architecture, as shown in FIG. 11. Received packets are stored in a buffer until a full coded segment becomes available. Then, coded segments are processed by the Decoder. In the next step, these segments are stored in a temporal file that feeds the Video Player, and they can be used to recover errors in subsequently received segments.

According to one embodiment, the nVoD client architecture is adapted to support redundancy channels and feedback error correction, as shown in FIG. 12. Consequently, according to one embodiment, and without limitation, the following modifications to the IEC architecture are implemented:

1. The client has a new buffer for storing undecoded segments. The Segment loader makes these available to the decoder whenever a new time slot begins.
2. The Decoder, the core of the client architecture, has a design that includes two levels of decoding stages. The first stage performs decoding similarly to the architecture without feedback error correction, but using previously undecoded segments as well. Additionally, if the first stage fails to perform decoding it produces undecoded segments. However, this does not mean that nothing is recovered. Partial decoding is still possible if a suitable combination of coded segment packets is available. The second decoder stage performs this task, improving recovery from packet losses. FIG. 13 shows a block diagram illustrating the internal architecture of the decoder according to one embodiment with feedback error correction. The client architecture comprises a packet receiver, an input buffer, a packet processor, a decoder, an output buffer, a segment loader, and a file writer.

C. Experimental Validation and Test Results

This section presents the methodology for experimental validation and the obtained results showing the superior performance of the proposed method, system, and apparatus according to one embodiment when compared with a reference schema (schema described by Jenkac and Stockhammer in "Asynchronous Media Streaming over Wireless Broadcast Channels. Proceedings International Conference on Multimedia and Expo, ICME, 1318-1321, 2005").

Figure 14:
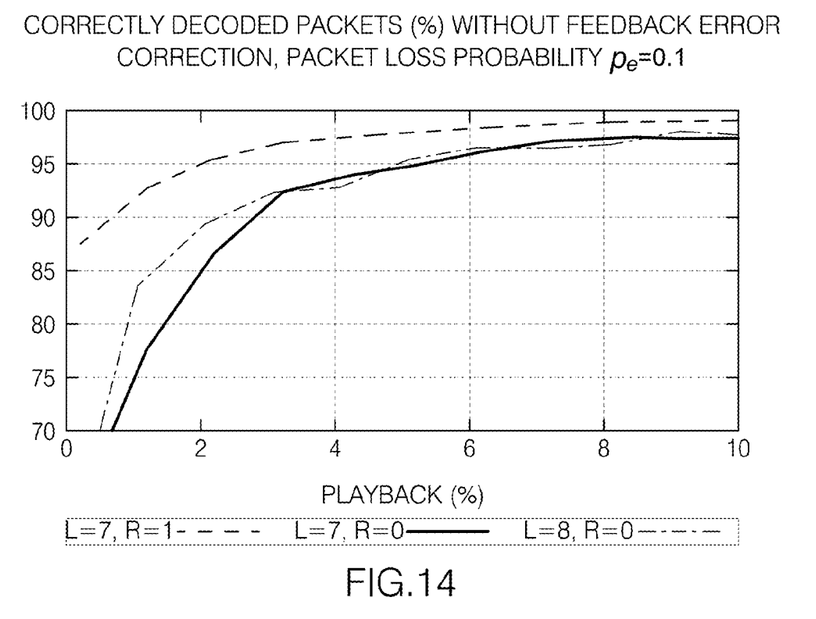
FIG. 14-17 show illustrative experimental results conducted to assess the performance of proposed embodiments.
Figure 15:
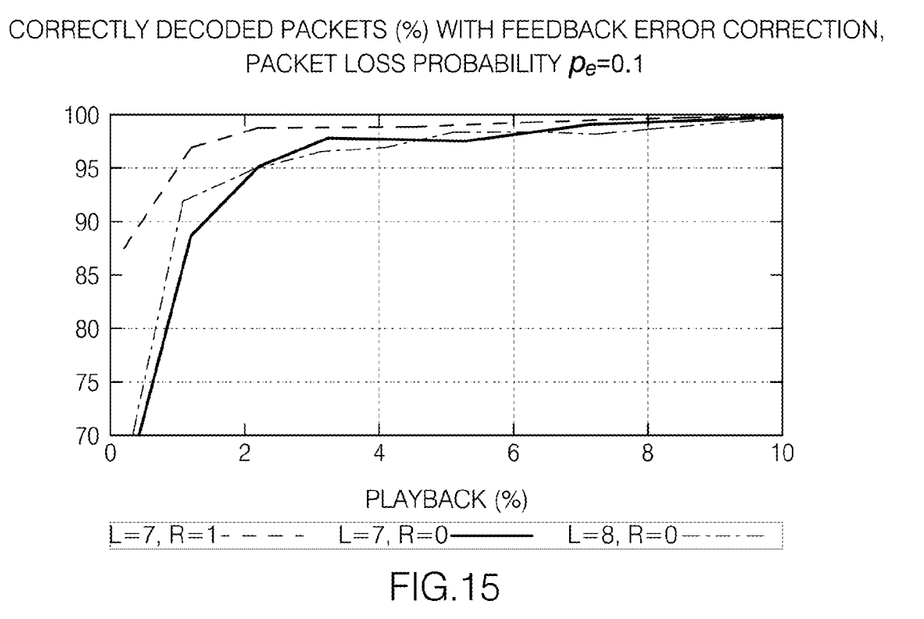

FIG. 14 and FIG. 15 show the decoding performance for different tests assuming a transmission channel with a uniformly distributed packet loss probability $p_e=0.1$:

FIG. 14 shows the results obtained in three different cases without feedback error correction. In two of the cases there is an IEC schema with seven channels, L=7, but in one of them there is an additional redundancy channel, R=1. In the third case there are eight information channels, L=8, without any redundancy channel, R=0. As can be observed, the best performance in terms of correctly decoded packets corresponds to the IEC schema with L=7 and R=1. The other two cases perform similarly, which indicates that the number of channels does not significantly affect decoding capabilities.

FIG. 15 shows the same cases with feedback error correction. Again, the best performance corresponds to L=7, R=1. However, feedback error correction considerably improves error correction during the first time slots. After these slots, the previously downloaded segments become more relevant and the benefits provided by feedback error correction decrease.

As shown in FIG. 15, a client who waits for 2% of the content duration would be able to view the video without subjective quality loss (decoding success of over 99%). Some considerations should be noted regarding the reference nVoD schema:

This schema can only correct errors by means of redundancy whereas IEC uses previously downloaded segments as well.

Assuming the same decoding efficiency (the same decoding system can be implemented in both IEC and the reference schema) both schemas achieve similar results when no previous segments are available. In the presence of redundancy, IEC necessarily performs better.

Figure 16:
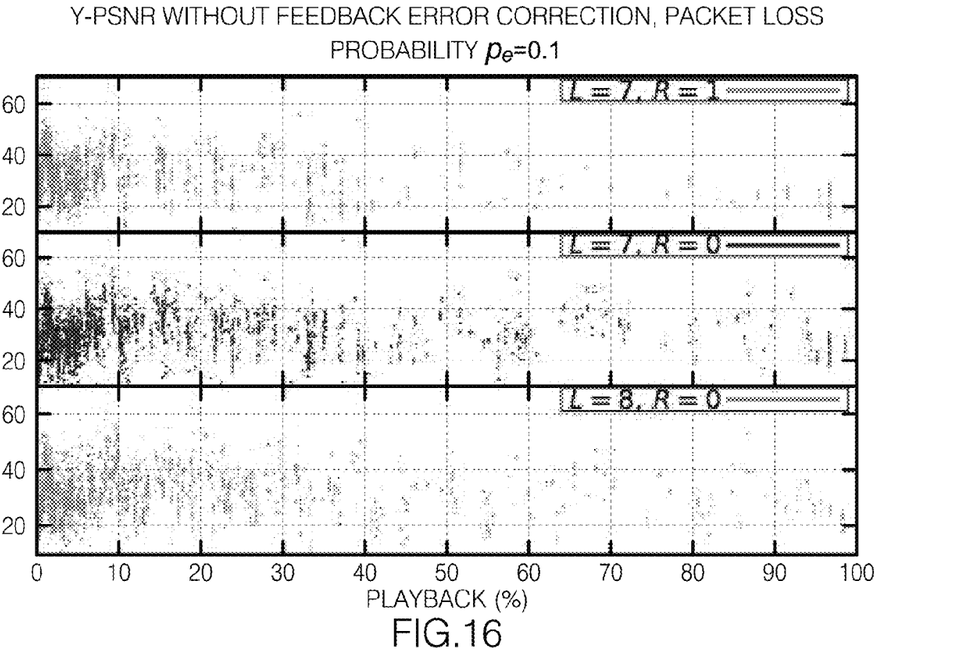
Figure 17:
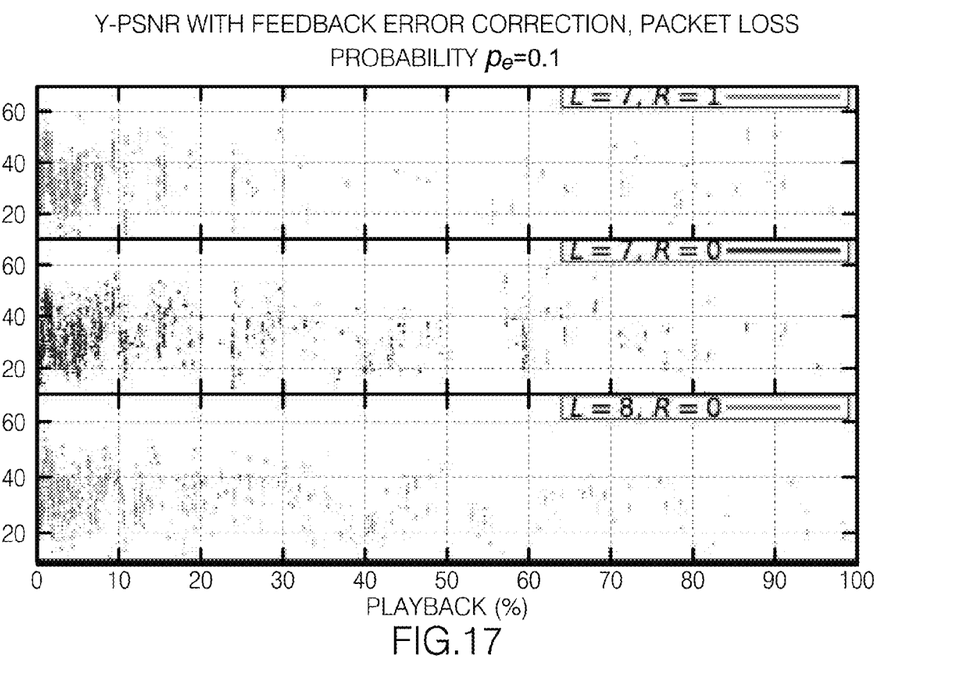

FIG. 16-17 show the Y-PSNR for three different setups, with and without feedback error correction. The results show that L=7, R=1 with proposed feedback error correction achieves the best results. Note that PSNR improves with playback as predicted by the theoretical model.

D. Alternative Embodiments

While particular embodiments have been described, it is understood that, after learning the teachings contained in this disclosure, modifications and generalizations will be apparent to those skilled in the art without departing from the spirit of the disclosed embodiments. It is noted that the disclosed embodiments and examples have been provided merely for the purpose of explanation and are in no way to be construed as limiting. While the methods, systems, and apparatuses have been described with reference to various embodiments, it is understood that the words which have been used herein are words of description and illustration, rather than words of limitation. Further, although the system has been described herein with reference to particular means, materials and embodiments, the actual embodiments are not intended to be limited to the particulars disclosed herein; rather, the system extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosed embodiments in their aspects.

The invention claimed is:

1. A method for digital content transmission, comprising:
    (a) partitioning said digital content into a plurality of sequential segments;
    (b) selecting a plurality of transmission time instants for each of said sequential segments as a function of an order of said plurality of sequential segments;
    (c) generating a plurality of linear combinations of said plurality of sequential segments during said plurality of transmission time instants resulting in a plurality of linearly combined coded segments;
    (d) performing error correction based on an implicit error correction (IEC) method wherein said IEC method performs error correction without extra bandwidth cost by using the redundancy present in said linearly combined coded segments to provide intrinsic error correction at said client side; and
    (e) transmitting said plurality of linearly combined coded segments from a server to a plurality of clients.

2. The method of digital content transmission of claim 1, wherein said IEC method error protection level increases with time.

3. The method of digital content transmission of claim 2, wherein said IEC is a zero overhead error correction method based on using previously decoded segments to decode coded segments and recover lost segments.

4. The method of digital content transmission of claim 3, wherein said IEC uses a selected number of extra channels for explicit redundancy during specified times of a transmission to guarantee a desired packed loss recovery.

5. The method of digital content transmission of claim 4, wherein said IEC introduces a modified schema that increases an initial playback delay.

6. The method of digital content transmission of claim 5, further comprising feedback error correction.

7. The method of digital content transmission of claim 6, wherein said feedback error correction comprises:
    (a) storing a plurality of undecoded segments; and
    (b) reloading said previously stored undecoded segments and attempting to decode them using recently decoded segments.

8. The method of digital content transmission of claim 7, wherein said client includes a separate buffer for said undecoded segments.

9. The method of digital content transmission of claim 8, wherein said client further includes a segment loader that makes undecoded segments available whenever a new time slot begins.

10. The method of digital content transmission of claim 9, wherein said client further comprises an architecture with two stages of decoding.

11. The method of digital content transmission of claim 10, wherein said client architecture comprises a buffer configured to store undecoded segments and a segment loader configured to make said undecoded segments to a decoder whenever a new time slot begins, said decoder configured to perform two stages of decoding including partial decoding.

12. The method of digital content transmission of claim 11, wherein said client architecture further comprises a packet receiver, an input buffer, a packet processor, a decoder, an output buffer, a segment loader, and a file writer; and said server comprises a coder and a multicast transmitter.

13. A system for digital content transmission, comprising:
    (a) a server configured for (1) partitioning said digital content into a plurality of sequential segments; (2) selecting a plurality of transmission time instants for each of said sequential segments as a function of an order of said plurality of sequential segments; (3) generating a plurality of linear combinations of said plurality of sequential segments during said plurality of transmission time instants resulting in a plurality of linearly combined coded segments; and
    (b) a client configured for performing error correction based on an implicit error correction (IEC) method wherein said IEC method performs error correction without extra bandwidth cost by using the redundancy present in said linearly combined coded segments to provide intrinsic error correction at said client side.

14. The system of digital content transmission of claim 13, further comprising a client architecture configured to execute a feedback error correction method.

15. The system of digital content transmission of claim 14, wherein said feedback error correction method comprises:
    (a) storing a plurality of undecoded segments; and
    (b) reloading said previously stored undecoded segments and attempting to decode them using recently decoded segments.

16. The system of digital content transmission of claim 15, wherein said client architecture comprises a buffer configured to store undecoded segments and a segment loader configured to make said undecoded segments to a decoder whenever a new time slot begins, said decoder configured to perform two stages of decoding including partial decoding.

17. The system of digital content transmission of claim 16, wherein said client architecture further comprises a packet receiver, an input buffer, a packet processor, a decoder, an output buffer, a segment loader, and a file writer; and said server comprises a coder and a multicast transmitter.

* * * * *